(12) United States Patent
Hanzawa

(10) Patent No.: US 6,894,722 B1
(45) Date of Patent: May 17, 2005

(54) ELECTRONIC EQUIPMENT FOR LOADING THEREON A RECORDING MEDIUM EMPLOYING A SOLID-STATE MEMORY ELEMENT

(75) Inventor: Masaki Hanzawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/487,675

(22) Filed: Jan. 20, 2000

(30) Foreign Application Priority Data

Jan. 22, 1999  (JP) .......................... P11-014516

(51) Int. Cl.$^7$ ........................... H04N 5/76; H04N 5/225

(52) U.S. Cl. ..................................... 348/231.7; 348/375

(58) Field of Search .............................. 348/231.7, 373, 348/374, 375; 386/118

(56) References Cited

U.S. PATENT DOCUMENTS

| | | | | |
|---|---|---|---|---|
| 5,179,505 A | * | 1/1993 | Matsuo ..................... | 348/231.7 |
| 5,657,081 A | * | 8/1997 | Kurahashi .................. | 348/375 |
| 5,781,232 A | * | 7/1998 | Ejima .......................... | 348/375 |
| 5,805,219 A | * | 9/1998 | Ejima et al. ................. | 348/375 |
| 5,907,354 A | * | 5/1999 | Cama et al. ............. | 348/231.7 |
| 6,493,033 B1 | * | 12/2002 | Glogan et al. .............. | 348/375 |

FOREIGN PATENT DOCUMENTS

JP         01245767 A  *  9/1989  .......... H04N/5/225

* cited by examiner

*Primary Examiner*—Tuan Ho
*Assistant Examiner*—Timothy J. Henn
(74) *Attorney, Agent, or Firm*—Jay H. Maioli

(57) ABSTRACT

An electronic equipment for recording information signals such as a video camera or an audio recording device includes a main body unit for recording the information on a memory member having a solid-state storage element, a memory holder provided on the main body unit of the equipment, a holder container formed on the outer periphery of the main body unit for accommodating the memory holder and a holder operating mechanism for causing movement of the memory holder between a loading/unloading position enabling loading/unloading of the memory member and a housing position for housing the memory holder in the holder container in a manner such as not to permit loading/unloading of the memory member. The memory holder has a terminal section for connection to a terminal of the memory holder, and is adapted for detachably holding the memory member. The holder operating mechanism maintains contact between the memory member and the terminal section in a state in which the memory holder having the memory member loaded on it has been moved from its position within the holder container to the loading/unloading position. This maintains the state of electrical connection to the main body unit of the device unless the memory member is not withdrawn from the memory holder.

7 Claims, 5 Drawing Sheets

ELECTRONIC EQUIPMENT FOR LOADING THEREON A RECORDING MEDIUM EMPLOYING A SOLID-STATE MEMORY ELEMENT

BACKGROUND OF THE INVENTION

1. Field of the Invention

This invention relates to an electronic equipment, such as a video camera device employing a recording medium accommodating a solid memory element and, more particularly, to a loading unit having a recording medium detachably loaded thereon.

2. Description of Prior Art

As a recording medium for a video camera for recording video signals or an audio recording apparatus for recording audio signals, there is employed a memory device having enclosed therein a solid memory element.

If this sort of the memory member is used in an information recording apparatus, such as a video camera, it is used as an auxiliary recording medium for a tape cartridge or a disc cartridge having a large recording capacity.

The video camera, employing this memory member along with the tape cartridge, is provided not only with a cartridge loading unit on which to load the tape cartridge, but also with a memory loading unit on which to load the memory member. This video camera includes a recording and/or reproducing unit for recording and/or reproducing the information on or from a tape cartridge and a memory member, a cartridge holder adapted for movement between a cartridge loading/unloading position for holding and loading/unloading the tape cartridge and a cartridge loading position enabling recording and/or reproduction of the information on or from the tape cartridge, and a memory loading mechanism for detachably holding the memory member. The memory loading unit, provided on the video camera, is provided on a main body unit of the video camera or on a casing adapted for covering the main body unit. The memory loading unit includes a memory inserting/ejecting opening, via which to insert or eject the memory member, and a memory housing portion in which to accommodate the memory member inserted via the memory inserting/ejecting opening. The memory loading unit includes a terminal portion, to which is connected a terminal of the memory member to be loaded, and an ejection lever for ejecting the memory member housed and loaded in the memory housing portion from the memory insertion/ejection opening.

The above-described video camera records the video information and the audio information on a tape cartridge at the time of imaging to record the picture information of e.g., a still picture on the memory member. The memory member, housed in the memory housing unit, is ejected from the memory insertion/ejection opening on actuating an ejection lever.

With the memory loading unit, provided on a video camera, the memory member is forcibly disconnected from the terminal member if the operation of ejecting the memory member from the inside of the memory housing unit is performed during the recording of the information on the memory member, so that the recording processing is interrupted in the course of the recording processing of information signals on the memory member.

If the recording processing on the memory member is interrupted, the information previously recorded thereon is destroyed to render it impossible to correctly record the information signals.

On the other hand, the memory loading unit, provided on the video camera, is poor in the degree of freedom in casing shape designing because the memory insertion/ejection opening of the memory holder needs to face the outside of the casing to enable the memory member to be inserted into or ejected from the insertion/ejection opening.

SUMMARY OF THE INVENTION

It is therefore an object of the present invention to provide an electronic equipment for recording information signals, such as a video camera or an audio recording apparatus, enabling a memory member to be dismounted from within the memory holder without impairing the information recorded on the memory member, and which is able to record information signals with improved reliability.

The present invention provides an electronic equipment for recording information signals on a video camera, an audio recording device or the like system. This electronic equipment includes a main body unit for recording the information on a memory member having a solid-state storage element, a memory holder provided on the main body unit of the equipment, a holder container formed on the outer periphery of the casing for accommodating the memory holder, and a holder operating mechanism for causing movement of the memory holder between a loading/unloading position which enables loading/unloading of the memory member for the memory holder and a housing position for housing the memory holder in the holder container in a manner such as not to permit loading/unloading of the memory member. The memory holder has a terminal section for connection to a terminal of the memory holder, and is adapted for detachably holding the memory member. The holder operating mechanism maintains contact between the memory member and the terminal section in a state in which the memory holder having the memory member loaded on it has been moved from its position within the holder container to the loading/unloading position. This maintains the state of electrical connection to the main body unit of the device unless the memory member is not withdrawn from the memory holder.

The holder operating mechanism used in this electronic equipment includes a lock member for restricting movement of the memory holder and a restriction-removing operating member for removing the restrictions as set by the lock member.

The main body unit of the equipment includes a cartridge holder for loadably/unloadably holding a recording medium cartridge carrying an information recording medium. The casing has an opening for causing the cartridge holder to face outwards and a lid for opening/closing the opening. The memory holder and the holder container are mounted on the lid.

The electronic equipment includes a detection unit for detecting movement of the memory holder from within the memory holder. The detection unit detects the movement of the memory member loaded in the memory holder.

The lid carrying the memory holder and the holder container is rotationally mounted relative to the main body unit of the equipment. The memory holder is rotatable with respect to the lid. The restriction-removing operating member of the holder operating mechanism is provided on the lid.

Other objects and advantages of the present invention will become apparent from the following description which is made with reference to the accompanying drawings.

DESCRIPTION OF THE PREFERRED EMBODIMENTS

Figure 1:
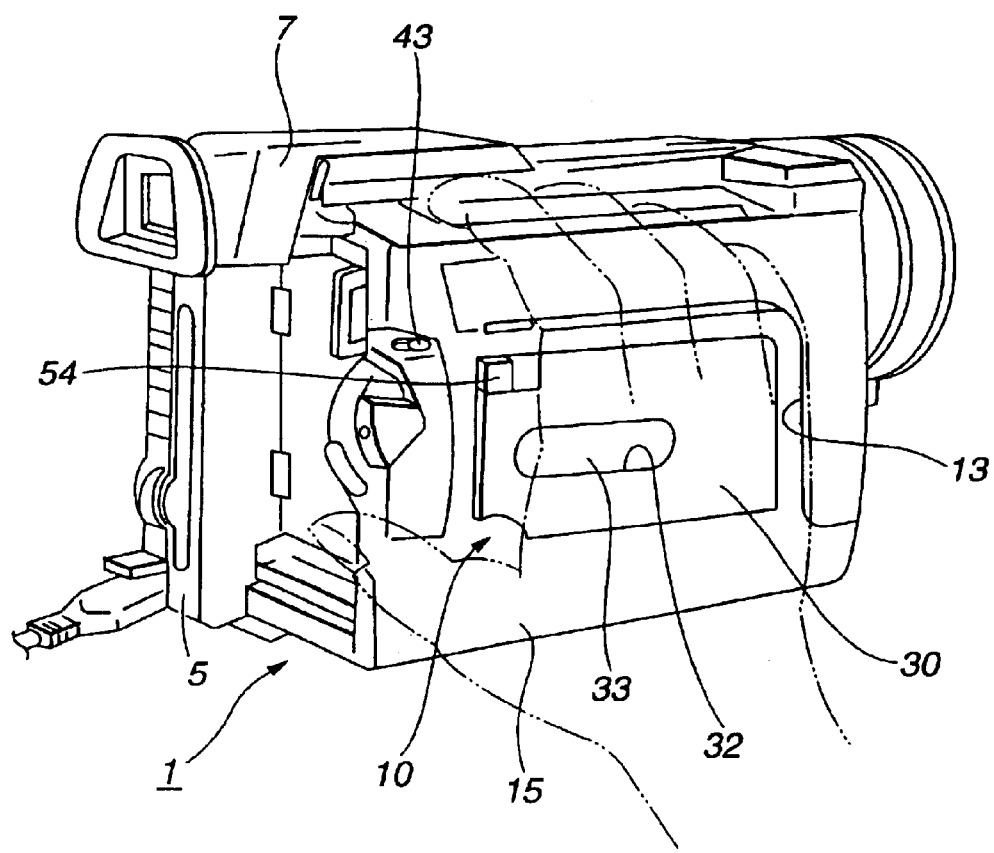
FIG. 1 is a perspective view showing a video camera embodying the present invention.

Referring to the drawings, a certain preferred embodiment of according to the present invention will be explained in detail.

As shown in FIG. 1, video camera 1, according to the present invention, includes a main body unit 5 of the video camera for recording and/or reproducing the information on or from a tape cartridge, a casing 7 for covering the main body unit 5 and a memory loading unit 10 for covering the main body unit 5 and a memory loading unit 10 provided on an outer rim of the casing 7 and on which is detachably loaded a memory member 4, which is shown in FIGS. 3 and 5–10.

The memory member 4, as a storage medium applied to the video camera 1, includes a solid-state memory element, such as a flash memory, in its inside, and has a substantially rectangular plate-like configuration. This memory member 4 is used for e.g., recording the information, such as a still picture. As the memory member 4, a so-called integrated circuit (IC) card may be used.

The main body unit 5 includes an information recording and/or reproducing unit for the tape cartridge and the memory member 4, a cartridge holder mounted for movement between a cartridge loading/unloading position for loading/unloading the tape cartridge with respect to the main body unit 5 and a recording and/or reproducing position for enabling information recording and/or reproduction for the tape cartridge, and a loading unit for causing movement of the cartridge holder.

The casing 7 is formed of a synthetic resin material and is provided on an outer peripheral portion of the main body unit 5. The casing 7 is formed with a cartridge insertion/ejection opening 13 for allowing the cartridge holder to face outside, and a lid 15 for opening/closing the cartridge insertion/ejection opening 13. This lid 15 has its lateral side rotatably supported via a rotational hinge pin 18 relative to the opening end of the cartridge insertion/ejection opening 13 of the casing 7, as shown in FIG. 2.

Figure 2:
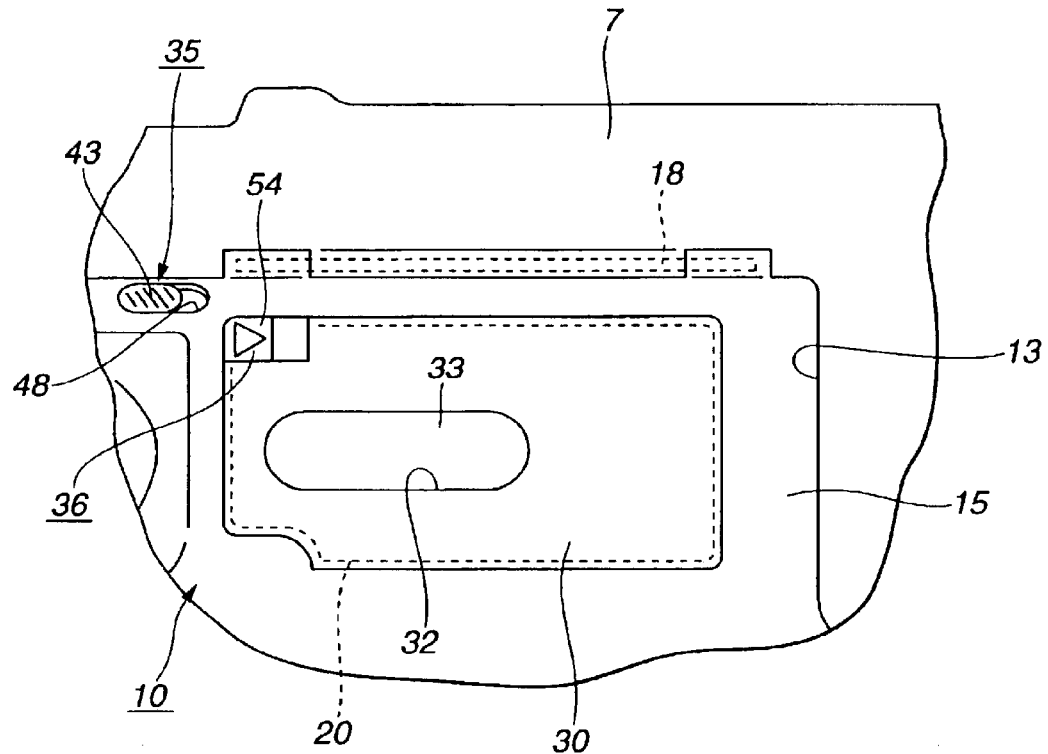
FIG. 2 is a plan view showing first and second loading/unloading units of a memory loading unit provided on a video camera according to the present invention.
Figure 4:
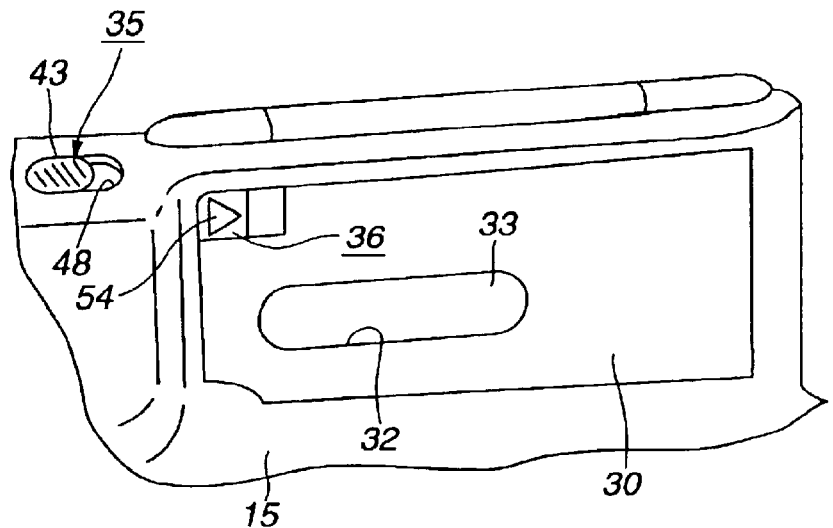
FIG. 4 is a perspective view showing the state in which a memory member is loaded on the memory loading unit.

As shown in FIG. 2, memory loading unit 10 is provided on a lid 15 rotatably mounted on the casing 7, and includes a memory holder 20 for holding the memory member. A holder housing section 21, which is shown in FIGS. 4 and 5, accommodates the memory holder 20 therein.

Figure 3:
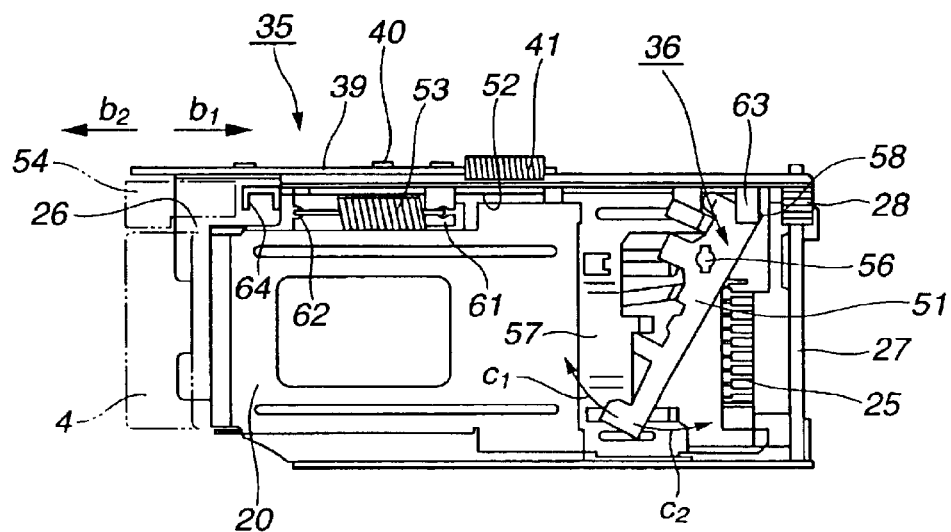
FIG. 3 is a see-through plan view of the first and second loading/unloading units.

The memory holder 20 is formed as a substantially rectangular box in one end of which is formed a memory inserting/ejecting opening 23 via which to insert or eject the memory member 4, as shown in FIGS. 2 and 3. In the major surface of the lid 15, rotatably supported by the casing 7, there is formed the recessed substantially rectangular holder housing section 21. The holder housing section 21 is provided at a mid portion of the lid 15 which is not adjacent to the corners of the outer casing 7, as shown in FIGS. 1 and 2.

On the opposite end in the memory holder 20 is provided a terminal section 25 to which is electrically connected a terminal of the memory member 4. The opposite end of the memory holder 20 is rotatably supported, via a rotary supporting shaft 27, on a base plate 26 fixedly mounted in the holder housing section 21. Thus, the memory holder 20 is rotated about the rotary supporting shaft 27 for movement between a position in which the memory holder 20 is housed in the holder housing section 21 and a position in which the memory inserting/ejecting opening 23 is protruded outwards from within the holder housing section 21 to permit insertion and ejection of the memory member 4.

Figure 5:
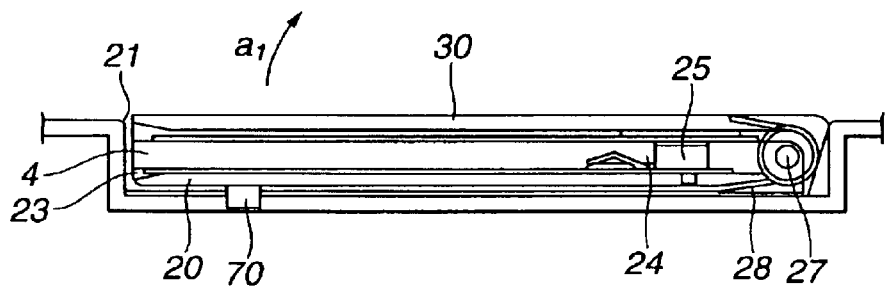
FIG. 5 is a longitudinal cross-sectional view showing the state in which a memory member is loaded on the memory loading unit.
Figure 6:
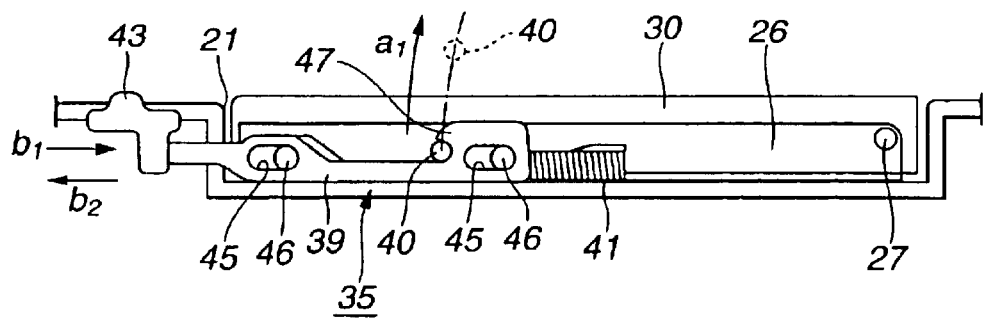
FIG. 6 is a longitudinal cross-sectional view showing the state in which the memory holder is operated by a first loading/unloading unit.

On one end of the rotary supporting shaft 27, there is provided a torsion coil spring 28 for biasing the memory holder 20 into rotation in the direction indicated by arrow a1 in FIGS. 5 and 6 to displace the memory holder 20 from inside the holder housing section 21. This torsion coil spring 28 has its one end and its other end retained by the memory holder 20 and by the bottom of a base plate 26, respectively.

The memory holder 20 is provided with a cover member 30 for covering the memory holder 20 housed in the holder housing section 21, as shown in FIGS. 2 and 4. This cover member 30 is formed of, for example, a synthetic resin material, and has its major surface formed with a substantially rectangular check window 32 with which to view and visually confirm the memory member 4 loaded in the memory holder 20. This check window 32 is fitted with a transparent panel member 33 via which to check the possible presence of the memory member 4 housed within the memory holder 20.

The video camera 1 according to the present invention includes a first loading/unloading unit 35 and a second loading/unloading unit 36, as shown in FIGS. 2 and 3. The first loading/unloading unit 35 causes rotation of the memory holder 20 in a direction towards and away from the inside of the holder housing section 21 to move the memory holder 20 between a loading/unloading position which permits loading/unloading of the memory member 4 relative to the inside of the memory holder 20 and a housing position which houses the memory holder 20 in the memory ru holder 20. The second loading/unloading unit 36 permits the memory member 4 to be inserted into and detached from the inside of the memory holder 20.

Referring to FIGS. 4 to 6, the first loading/unloading unit 35 includes a lock lever 39 for being engaged with the memory holder 20 for controlling the rotational operation of the memory holder 20 relative to the holder housing section 21, and a lock pin 40 provided on the memory holder 20 for being engaged by a lock lever 39. The first loading/unloading unit 35 also includes a compression coil spring 41 for biasing the lock lever 39 in a direction of engaging the lock lever 39 with the lock pin 40 of the memory holder 20 and a slide member 43 for sliding the lock lever 39 for uplifting and lowering the memory holder 20.

The lock lever 39 is formed with guide slits 45, 45 in which are inserted guide pins 46, 46 set upright on the lateral side of the base plate 26. The lock lever 39 is formed with an engagement pawl 47 adapted for engaging with the lock pin 40 of the memory holder 20, as shown in FIG. 6.

The lock pin 40 is provided upright on the lateral surface of the memory holder 20 and is engaged by the engagement pawl 47 of the lock lever 39 to cause the lock lever 39 to control the rotation of the memory holder 20.

The compression coil spring 41 has its one end retained by a spring mounting piece provided on the base plate 26 mounted in the inside of the holder housing section 21, while having its opposite end retained by a spring mounting piece of the lock lever 39. Thus, the compression coil spring 41 biases the lock lever 39 in the direction indicated by arrow b2 in FIG. 6 so that its engagement pawl 47 will be engaged with the lock pin 40 of the memory holder 20.

Figure 7:
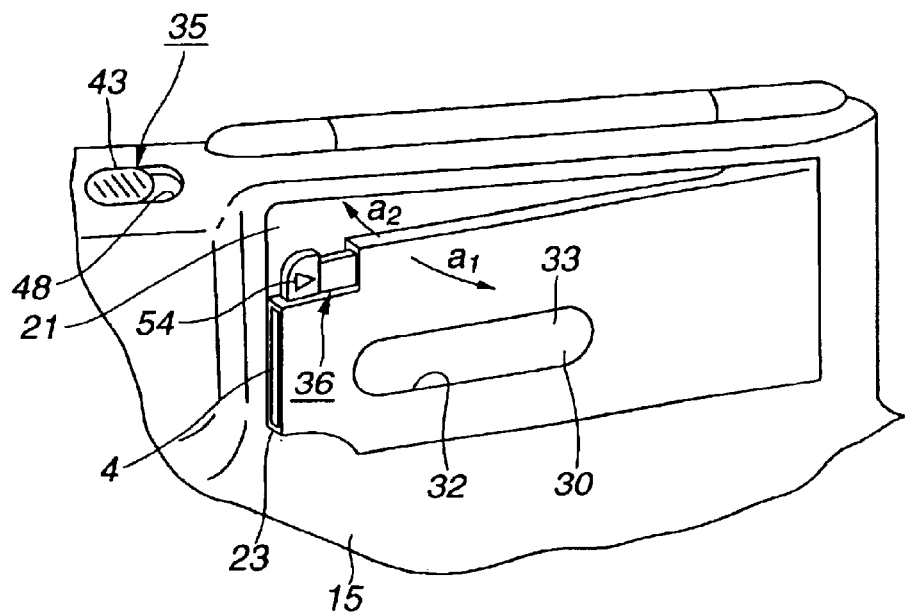
FIG. 7 is a perspective view showing the state in which the memory holder has been moved by the first loading/unloading unit.

The slide member 43 is provided for movement at a position facing one end of the lock lever 39. In the outer periphery of the casing 7 is formed a guide groove 48 adjacent to the holder housing section 21, as shown in FIGS. 4 and 7, so that the slide member 43 will be movable in the direction indicated by arrows b1 and b2 in FIG. 3.

Figure 8:
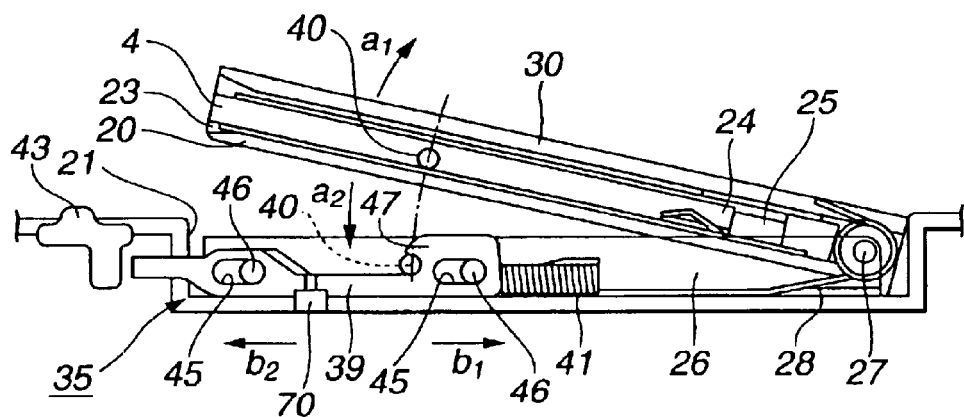
FIG. 8 is a longitudinal cross-sectional view showing the state in which the memory holder has been moved by the first loading/unloading unit.
Figure 9:
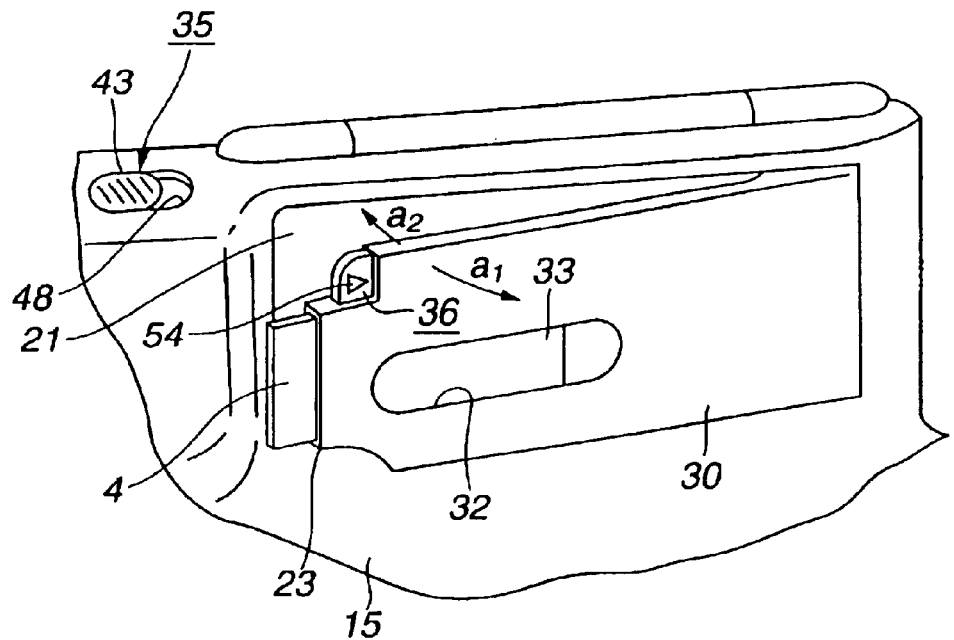
FIG. 9 is a perspective view showing the state in which the memory member is being ejected from the memory holder by a second loading/unloading unit.
Figure 10:
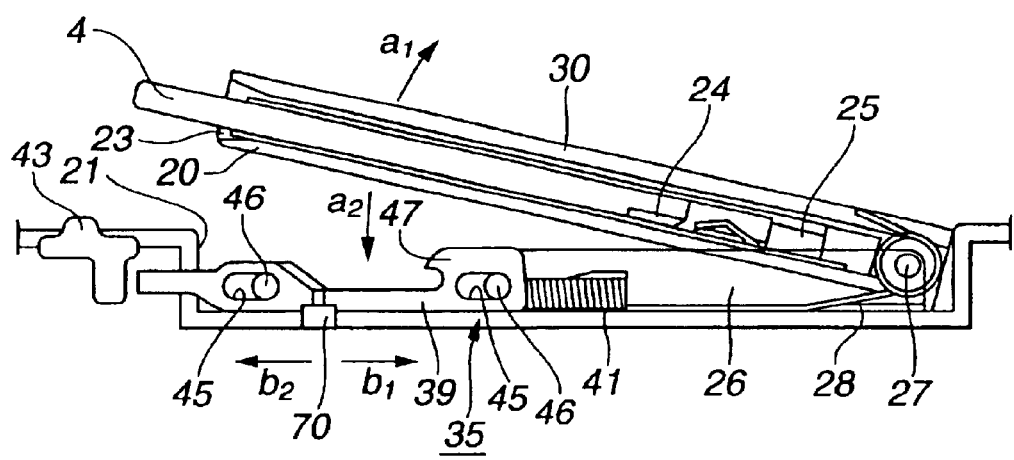
FIG. 10 is a longitudinal cross-sectional view showing the state in which the memory holder has been ejected from the memory holder by the second loading/unloading unit.

Within the holder housing section 21, there is provided a detection switch 70 having a detector thrust by the memory holder 20 at a position abutted to by the bottom surface of the memory holder 20 on accommodating the memory holder 20, as shown in FIGS. 5, 8 and 10. When the memory holder 20 is rotated from within the holder housing section 21, the detector so far thrust by the memory holder 20 is protruded to render it possible to detect reliably that the ejection operation of the memory member 4 has now been started.

By performing control so that the information recording processing for the memory member 4 will be halted on projection of the detector of the detection switch 70, it is possible to prevent a terminal of the memory member 4 from being disconnected from the terminal section 25 during recording processing, so that the memory member 4 can be reliably prohibited from being ejected from within the memory holder 20.

Referring to FIG. 3, the second loading/unloading unit 36 includes an ejection arm 51 for ejecting the memory member 4 from within the memory holder 20, an ejection lever 52 for operating this ejection arm 51, a torsion coil spring 53 for biasing the ejection lever 52 in the direction indicated by arrow b2 in FIG. 3 and a slide member 54 for sliding the ejection lever 52.

Referring to FIG. 3, the ejection arm 51 has its proximal end rotatably supported via a rotation supporting pin 56 set upright on the base plate 26 arranged within the memory holder 20. The ejection arm 51 is formed at its distal end with an abutment piece 57 for abutting against the memory member 4 for ejecting the memory member 4 from inside the memory holder 20. The ejection arm 51 is also formed at its proximal end with an operating piece 58 rotationally operated by the ejection lever 52.

The ejection lever 52 is arranged on a lateral surface of the memory holder 20 for movement in the direction indicated by arrows b1 and b2 of FIG. 3. In the ejection lever 52 are formed guide slits for guiding the movement direction, although these guide slits are not shown. In these guide slits is inserted and movably supported a guide shaft set upright on a lateral surface of the memory holder 20.

The ejection lever 52 is formed with a spring retainer 61 engaged by an end of the torsion coil spring 53 which biases the ejection lever 52 in the direction indicated by arrow b2 in FIG. 3. The torsion coil spring 53 has its other end engaged by a spring retainer 62 formed on a lateral surface of the memory holder 20.

Referring to FIG. 3, the ejection lever 52 has its distal end formed with an engagement piece 63, engaging with the operating piece 58 of the ejection arm 51, which ejection arm 51 is rotationally driven via this engagement piece 63. The ejection lever 52 is also formed with an operating piece 64 thrust by the slide member 54.

The slide member 54 is arranged facing one end of the ejection lever 52 and is movably supported on the cover member 30 for movement in the direction indicated by arrows b1 and b2 in FIG. 3.

The operation of the first and second loading/unloading unit 35 and 36 in the memory loading unit 10 of the video camera 1, constructed as described above, is hereinafter explained with reference to the drawings.

With the video camera 1, the slide member 43 of the first loading/unloading unit 35 is operated, as shown in FIGS. 4, 5 and 6, for causing movement of the lock lever 39 in the direction indicated by arrow b1 in FIG. 6, by operating the slide member 43 of the first loading/unloading unit 35, as shown in FIGS. 4 to 6. As the lock lever 39 is moved in the direction indicated by arrow b1, as shown in FIGS. 7 and 8, the lock pin 40 and the engagement pawl 47 of the memory holder 20 are disengaged from each other so that the memory holder 20 is rotated in the direction indicated by arrow a1 in FIG. 5, about the rotary supporting shaft 27 as the center of rotation, under the bias of the torsion coil spring 28.

When the memory member 4, loaded inside the memory holder 20, is separated from the inside of the memory holder 20, as shown in FIGS. 7 and 8, the terminal 24 of the memory member 4 is maintained in the connected state to the terminal 25, as shown in FIG. 8.

If, with the video camera 1, the slide member 54 of the second loading/unloading unit 36 of the video camera 1 is operated, with the memory holder 20 having been moved to an insertion/ejection position spaced apart from the inside of the holder housing section 21, the ejection lever 52 is moved in the direction indicated by arrow b1 in FIG. 3 against the bias of the torsion coil spring 53, as shown in FIGS. 7 and 8. As the ejection lever 52 is moved in the direction indicated by arrow b1, the engagement piece 63 compresses against the operating piece 58 of the ejection arm 51 to cause rotation of the ejection arm 51 in the direction indicated by arrow c1 in FIG. 3, about the rotary supporting shaft 56 as the center of rotation.

As the ejection arm 51 is rotated in the direction indicated by arrow c1, the terminal of the memory member 4 is moved in a direction away from the terminal section 25 to eject the memory member 4 via the memory inserting/ejecting opening 23 of the memory holder 20. Since the information recording processing by the memory member 4 has come to a close by the time the terminal section 25 is detached from the terminal section 25, the information recorded on the memory member 4 is reliably protected against destruction.

Meanwhile, with the second loading/unloading unit 36, the terminal 24 of the memory member 4 is connected to the terminal section 25, as the memory member 4 is loaded within the memory holder 20, at the same time as the ejection arm 51 is rotated in the direction indicated by arrow c2 in FIG. 3, about the rotary supporting shaft 56 as the center of rotation.

It is noted that, if the memory member 4 is loaded in position in the memory holder 20, the second loading/unloading unit 36 cannot be moved in a state in which the first loading/unloading unit 35 is not operated, that is in a state in which the memory holder 20 is not housed in the holder housing section 21.

Therefore, with the memory loading unit 10, it is necessary to actuate not only the first loading/unloading unit 35 but also the second loading/unloading unit 36, in order to take the memory member 4 from inside the memory holder 20, so that time necessary in halting the information recording processing on the memory member 4 is procured. Thus, it is possible to prevent interruption of the information recording operation on the memory member 4. Meanwhile, when the memory holder 20 is moved via the first loading/unloading unit 35 from its position in the holder housing section 21 to the inserting/ejecting position, the information recording processing for the memory member 4 already has come to a close.

With the memory loading unit 10, provided on the video camera 1, in which the memory member 4 is ejected from the inside of the memory holder 20 by actuating the first and second loading/unloading units 35, 36, it is possible to reliably prohibit the terminal section 25 from being disconnected during the information recording processing on the memory member 4. Thus, with the present video camera 1, it is possible to reliably prevent destruction of the information recorded on the memory member 4 or the information being recorded and hence to improve reliability of the information recording processing for the memory member 4.

Also, since the memory loading unit 10 is provided on the outer periphery of the cover member 30, the video camera 1 is arranged within a plane of the cover member 30 constituting the outer periphery of the casing 7. Thus, with the video camera 1, it is unnecessary to mount the memory inserting/ejecting opening 23 of the memory holder 20 of the memory loading unit 10 at a position facing the outside of the casing 7, so that it is possible to improve the degree of freedom of e.g., the shape of the casing 7. Moreover, since the space on the cover member 30 can be exploited effectively, the overall device can be reduced in size.

Also, with the present video camera 1, in which the memory holder 20 is movable relative to the holder housing section 21, so that the memory loading unit 10 is not protruded on the outer periphery of the casing 7, the overall device can be reduced in thickness.

Although the present invention is applied in the foregoing embodiment to a video camera, the present invention may also be applied to an audio recording device or other information recording devices, employing a memory member having an internal solid-state storage element as a recording medium for information signals, with advantages similar to those in case of the video camera.

What is claimed is:

1. An electronic equipment employing a memory member having a solid-state storage element as a recording medium, the electronic equipment comprising:
    a main body unit for recording information on said memory member having said solid-state storage element;
    a memory holder provided on said main body unit and having a terminal section for connection to a terminal of said memory member, said memory holder being adapted for detachably holding said memory member;
    a holder container formed on an outer periphery of said main body unit for accommodating the memory holder therein;
    a holder operating mechanism for causing movement of said memory holder between a loading/unloading position enabling loading/unloading of said memory member and a housing position for housing said memory holder in said holder container in a manner such as not to permit loading/unloading of said memory member, wherein
    said memory holder includes a locking mechanism for maintaining an electrical contact between said memory member loaded in said memory holder and said terminal section when said memory holder is moved from said housing position to said loading/unloading position, and
    said locking mechanism is adapted to enable said loading/unloading of said memory member from said memory holder by applying a release force thereon, and
    when said release force is applied to said locking mechanism, said electrical contact between said memory member and said terminal section is disconnected; and
    detection means for detecting whether said memory holder has been moved from the holder container.

2. The electronic equipment according to claim 1 wherein said main body unit includes a cartridge holder for loadably/unloadably holding a recording medium cartridge carrying an information recording medium, said main body unit having an opening for causing the cartridge holder to face outwards and a lid for opening/closing said opening, said memory holder and the holder container being mounted on said lid.

3. The electronic equipment according to claim 2 wherein said holder operating mechanism includes a lock member for restricting movement of said memory holder and a restriction-removing operating member for removing movement restrictions imposed by said lock member and wherein said restriction-removing operating member of said holder operating mechanism is provided on said lid.

4. The electronic equipment according to claim 1 wherein said holder container is formed at a mid portion on the outer peripheral surface of said main body unit.

5. The electronic equipment according to claim 1 wherein a major surface facing an exterior of the memory holder is formed substantially as a continuation to the outer periphery of said main body unit.

6. The electronic equipment according to claim 1 further comprising a window formed in said memory holder for visually checking a presence of the memory member held in said memory holder.

7. An electronic equipment employing a memory member having a solid-state storage element as a recording medium, the electronic equipment comprising:
    a main body unit for recording information on said memory member having said solid-state storage element;
    a memory holder provided on said main body unit and having a terminal section for connection to a terminal of said memory member, said memory holder being adapted for detachably holding said memory member;
    a holder container formed on an outer periphery of said main body unit for accommodating the memory holder therein;

a holder operating mechanism for causing movement of said memory holder between a loading/unloading position enabling loading/unloading of said memory member and a housing position for housing said memory holder in said holder container in a manner such as not to permit loading/unloading of said memory member, wherein said memory holder includes a locking mechanism for maintaining an electrical contact between said memory member loaded in said memory holder and said terminal section when said memory holder is moved from said housing position to said loading/unloading position, and said locking mechanism is adapted to enable said loading/unloading of said memory member from said memory holder by applying a release force thereon, and when said release force is applied to said locking mechanism, said electrical contact between said memory member and said terminal section is disconnected, wherein said main body unit includes a cartridge holder for loadably/unloadably holding a recording medium cartridge carrying an information recording medium, said main body unit having an opening for causing the cartridge holder to face outwards and a lid for opening/closing said opening, said memory holder and the holder container being mounted on said lid; and means for rotationally mounting said lid on said main body unit of the equipment and wherein said memory holder is rotationally mounted relative to said lid.

* * * * *